United States Patent [19]

Bunn

[11] Patent Number: 5,225,809
[45] Date of Patent: Jul. 6, 1993

[54] PERSONAL SECURITY SYSTEM AND APPARATUS THEREFOR

[75] Inventor: Charles G. Bunn, Houston, Tex.

[73] Assignee: Mayday U.S.A. Inc., Houston, Tex.

[21] Appl. No.: 632,526

[22] Filed: Dec. 24, 1990

[51] Int. Cl.⁵ .................. G08B 13/00; G08B 5/22; G01S 3/02; G06G 7/12

[52] U.S. Cl. ................... 340/574; 340/693; 340/825.49; 342/451; 364/575; 455/54.2

[58] Field of Search .......... 340/574, 505, 825.54, 340/525, 825.08, 693, 636, 825.49, 311.1; 358/105, 108; 455/53, 53.1, 54.1, 54.2, 95, 128; 364/520, 575; 342/44, 443-445, 451; 343/894, 702

[56] References Cited

U.S. PATENT DOCUMENTS

| | | | |
|---|---|---|---|
| 3,886,534 | 5/1975 | Rosen et al. | 340/525 X |
| 4,850,018 | 7/1989 | Vogt | 340/505 X |
| 4,998,095 | 3/1991 | Shields | 340/574 |

*Primary Examiner*—Thomas Mullen
*Attorney, Agent, or Firm*—James L. Jackson

[57] ABSTRACT

A personal security system and process for use thereof wherein customers of a security service are provided with personal transmitters capable of selectively transmitting one or more radio signals at a desired frequency, the signals representing the particular character of service that is desired. A number of antenna/transmitters are located in evenly spaced relation in the geographical area and correspond to a computer grid work of the geographical area. The antenna/transmitters receive signals having X and Y axes from the personal transmitters, amplify the signals and transmit them to signal processing equipment. The signal processing equipment includes an automatic direction finding circuit capable of receiving the X and Y axes components of the personal transmitter signal and the vertical elevation of the signal in order to yield an ADF signal output reflecting the location of the signal. The ADF output signal is then processed by means of a computer such that the signal is displayed on a cathode ray tube impressed with a map of the geographical area and the antenna grid work to thus display a signal representing the position of the personal transmitter on a grid of the geographical area. This signal can be further processed to locate the personal transmitter on a small portion of the grid work to thus provide service personnel with the capability of efficiently locating and servicing the signal transmitting customer's needs.

15 Claims, 4 Drawing Sheets

PERSONAL SECURITY SYSTEM AND APPARATUS THEREFOR

FIELD OF THE INVENTION

This invention relates generally to security systems for rendering an alarm to thus alert appropriate personnel to the needs of a person, place or business in distress. More specifically, the present invention relates to a personal security system having a selective multi-signal generating capability which is capable of being transported efficiently within a predetermined geographical area and which enables the user of the personal security system to be efficiently and accurately located within the geographical area and to be provided with appropriate service as requested.

BACKGROUND OF THE INVENTION

Electrical and electronic security systems have long been provided to owners and subscribers to protect persons or property in specific locations such as homes, buildings, etc. Various other security systems have been developed and marketed for the purpose of protecting mobile property such as automotive vehicles, boats, etc. and persons and other property associated therewith.

To date, no security system has been developed and marketed which has the capability to provide mobile persons and equipment with both locating and protective capability in a specific geographical area such as a large city, county, etc. Persons who travel within a specific geographical area, whether walking or traveling in a vehicle, riding a bicycle, etc., may encounter difficulty and require assistance. This difficulty can be in the form of medical trauma, thus requiring the services of a physician, ambulance, etc. Another form of difficulty that could be encountered is in the area of public safety where the person may need the assistance of the police or other law enforcement agencies. Especially where the person is traveling in a vehicle such as an automobile, the vehicle may have mechanical trouble and thus the person may require the assistance of a suitable mobile repair facility for repair, towing, etc. From the standpoint of business, it will be desirable in many instances to know the whereabouts of personnel so that at a moment's notice the appropriate person may be located and directed to a location where services should be performed. It is desirable, therefore, to provide persons subscribing to a security system to have the capability of requesting the specific character of assistance needed, such as medical, police, repair service, business assistance, etc. by means of an appropriate radio signal. It is also desirable to provide mobile persons with the capability of being located within a specific geographical area such as by means of electronic processing of the radio signal transmitted by the subscriber to thus permit service personnel to come to their aid without delay.

SUMMARY OF THE INVENTION

In accordance with the present invention, a subscriber to the security system of this invention will be provided with a battery powered transmitter capable of transmitting either one or a plurality of radio signals. Each radio signal being appropriately coded by its frequency to indicate the specific type of service required by the subscriber. A plurality of automatic direction-finding antennas ADF will be located in appropriately organized and spaced relation within the geographical area and will be capable of receiving and transmitting radio signals of the subscriber's transmitter. The signals being transmitted are relayed by the antennas to a base station having a computer system programmed for direction finding and other signal processing. The antenna/transmitters will be narrowly tuned to the transmitting frequency of the subscriber's transmitter and will be capable of receiving and transmitting radio signals having X and Y axes to the base station. The antenna/transmitters may be in the form of stand alone equipment each having its own power source provided by batteries of extensive service life. This feature provides the antenna/transmitters with the capability of receiving and transmitting even in the event of general power failure in the geographical area.

During installation the antenna/transmitters will be positioned so that the spacing between antenna/transmitters will not exceed a predetermined distance, such as one mile for example. This will provide an antenna network having a signal coverage area that ensures 100% overlap of the antenna/transmitters.

An automatic direction finder (ADF) and a computer system will be incorporated in the base station for the purpose of electronically processing the radio signals that are received from the various antenna/transmitters. When a subscriber's personal transmitter is activated, the antenna/transmitters will receive the signal and transmit X and Y axes codes to a base station antenna. The base station antenna will send this information to the automatic direction finder. The ADF will process the signals for average and will transmit the subscriber's averaged X and Y axes signals to a computer provided with software representing a map of the geographical area provided with a grid work. When the averaged X and Y axes signals are received the computer will identify the specific quadrant or section of the geographical area within which the subscriber's transmitter is located. In this manner, service personnel will be very quickly provided with information identifying the customer's location within a small section of the geographical area, thereby enabling service personnel to locate the transmitter and provide the appropriate service without delay.

KEY COMPONENT IN NETWORK SYSTEM

The antenna system for the personal security system of this invention includes a plurality of strategically located antennas each having automatic direction finding capability (ADF) and each having the capability of both receiving and transmitting radio signals and each being referred to as a "Smart Antenna". The Smart Antenna is the key apparatus to an antenna network which is employed to cover a geographical area having many square miles in a typical city. For example, a large city having 800 square miles will be completely covered by the antenna system. Each antenna device employs a unique combination of specifically designed printed circuit boards that enable the Smart Antenna to provide 24 hour operation, recognize the signals of the transmitters, report maintenance information, (battery voltage, signal strength, Antenna identification, and transmitter identification.

As an example, for a large city, 800 or so Smart Antennas can comprise an antenna/transmitter network that is capable, through a software and database search, to identify a transmitter from its signal, identify the location of the transmitter itself with respect to the antenna network and report to a control console the specific location of the transmitter with respect to the geographical area of the city that is monitored by the antenna/transmitter network.

It is therefore a feature of the present invention to provide a novel security system enabling a mobile customer or subscriber to selectively transmit one of a plurality of coded radio signals for the purpose of requesting any one of several specific types of services at any location within a specific geographical area.

It is another feature of the present invention to provide a novel security system having the capability of receiving, transmitting and processing radio signals having X and Y axes to thus provide for efficient location of the source of the transmitted radio signals within a relatively small section of the geographical area.

It is an even further feature of the present invention to provide a novel personal security system including signals processing equipment in the form of a computer presenting a map of a specific geographical area which may be subdivided by a grid work and enabling the location of transmitting signal within a specific section of the grid work by means of computerized processing of radio signals.

An even further feature of this invention contemplates the provision of a novel personal security system which enables a customer or subscriber to transmit an appropriate radio signal at a specific time within a designated geographical area to thus enable the customer to be efficiently and quickly located and provided with appropriate requested service at the customer's location within the geographical area so that personal safety can be effectively maintained.

Other and further objects, advantages and features of the present invention will become apparent to one skilled in the art upon consideration of the written specification, the attached claims and the annexed drawings. The form of the invention, which will now be described in detail, illustrates the general principles of the invention but it is to be understood that this detailed description is not to be taken as limiting the scope of the present invention.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is a diagrammatic illustration of a personal security system constructed in accordance with the present invention and showing a base antenna, a Smart Antenna network and a personal transmitter together with the respective transmitter signals thereof.

FIG. 2 is a sectional view of a Smart Antenna constructed in accordance with the present invention.

FIG. 3 is an electrical block diagram illustrating the processing of the polling signal from the base antenna by a Smart Antenna receiving the signal.

FIG. 4 is a block diagram electrical schematic illustrating the radio direction finder and its signal processing for identifying and storing the bearing from the personal transmitter to a respective Smart Antenna.

FIG. 5 is a block diagram electrical schematic illustrating the processing of a transmitter frequency being received by the receiver card circuitry and selective buffer storage of appropriate signals.

FIG. 6 is another block diagram electrical schematic illustrating electrical processing of the polling clock pulse from the base antenna and storage of selected data in the buffer circuitry.

FIG. 7 is a graphical representation of automatic antenna detected and computer processed data enabling identification of the location of a customer's remote transmitter in elevation above the ground.

DETAILED DESCRIPTION OF PREFERRED EMBODIMENT

Figure 1:
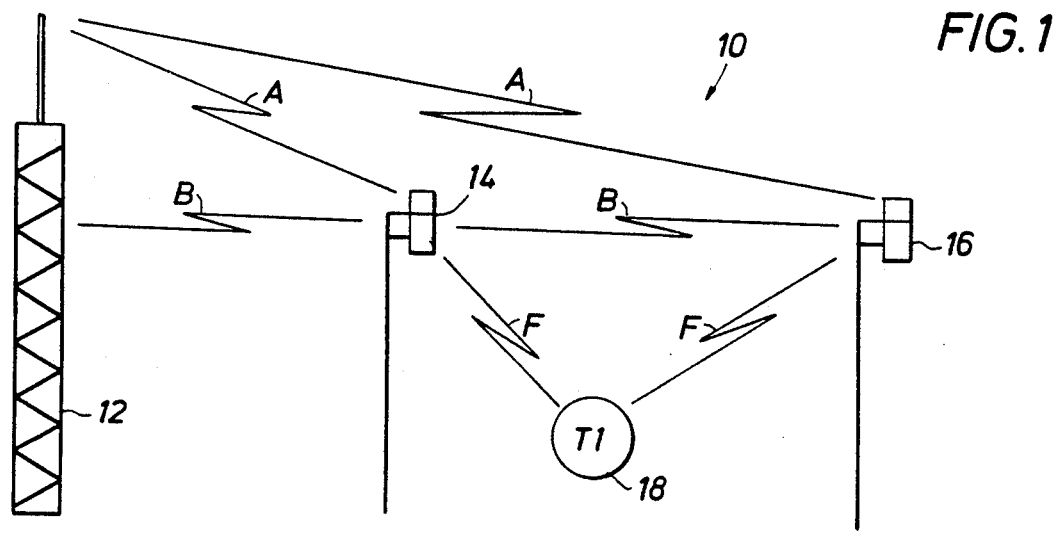

Referring now to the drawings and first to FIG. 1, a personal security system constructed in accordance with the present invention is illustrated generally at 10. It incorporates a base antenna 12 which is preferably situated centrally of the geographical area covered by the personal security system. A plurality of signal receiving and processing antennas which, as indicated above, are referred to herein as "Smart Antennas", two of which are shown at 14 and 16. The Smart Antennas are positioned in substantially evenly spaced relation throughout the geographical area so as to form an antenna/transmitter grid work. The antenna grid work, as will be explained hereinbelow, is capable of being displayed on the cathode ray tube (CRT) of a computer system, identified herein as a "buffer", which functions cooperatively with the base antenna and Smart Antennas to identify and process position locating signals of any one of a number of personal assistance transmitters, one of which is shown at 16 in FIG. 1.

The base antenna 12 generates a polling signal A which is received by all of the respective Smart Antennas of the Smart Antenna network. The Smart Antennas of the network also have a signal transmitting capability, transmitting coded signals B that are received by the base antenna. The Smart Antennas are also known as ADF antennas as they have an automatic direction finding capability for identifying the bearing therefrom to the location of the personal transmitter T-1 shown at 18. The polling signal is transmitted from the base antenna to the Smart Antenna network. This polling signal sets the network and reporting information timing. The personal transmitter 18 transmits an identification (ID) code that is received by at least two of the Smart Antennas 14-16. This identification code is processed by the buffer to insure positive identification of the transmitter of an individual customer subscribing to the service. Improper signals that do not correspond to the ID code are rejected, passed and cleared from the signal processing system. Each of the mobile customer's transmitters are provided with the capability of transmitting signals of a plurality of frequencies, each frequency being designated for a particular service that is desired. These radio signals each have X and Y axes which are identified by two or more Smart Antennas and through a software and database search by the computer system of the base station, identify the transmitter, locate the transmitter and report its location on the geographical area to a control console. The control console will display the location of the signal generation (transmitter location) on the CRT display of the geographical area to thus enable service personnel to be directed to the scene as rapidly as possible.

Figure 2:
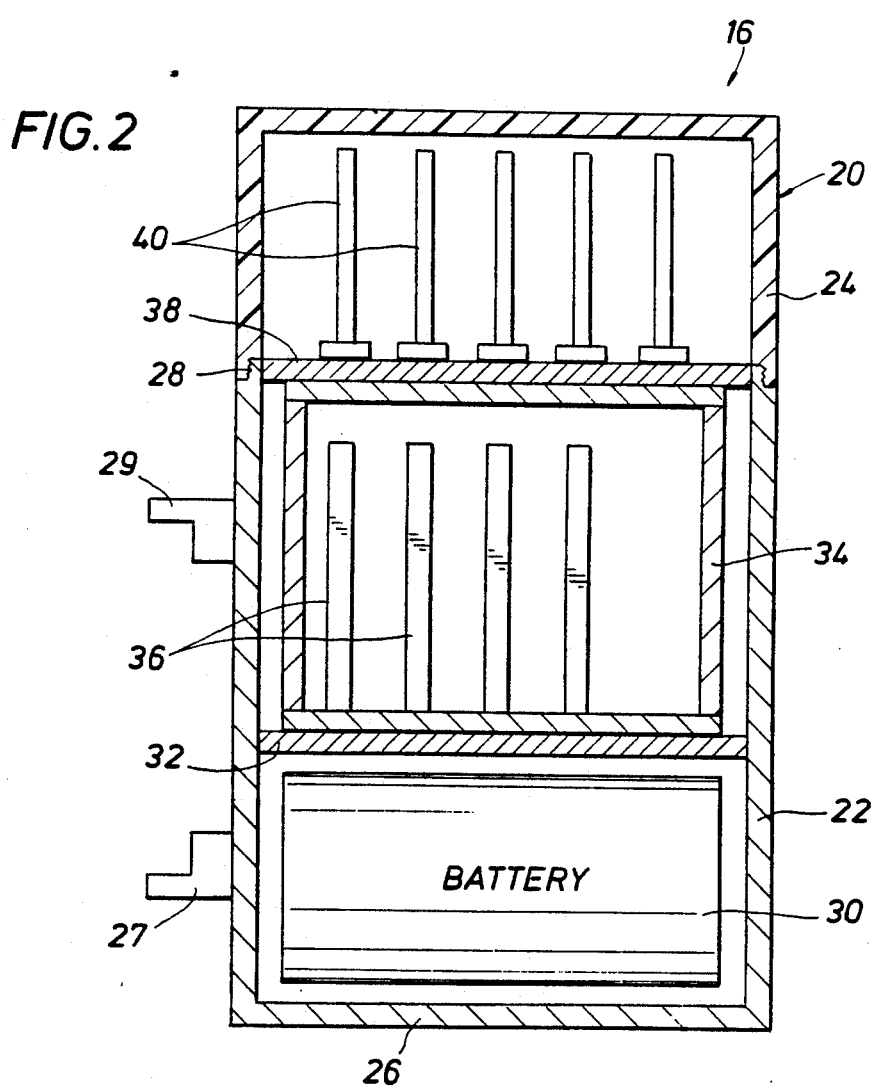

With reference now to FIG. 2, the housing and internal components of the Smart Antenna shown generally at 16 are illustrated in detail. As shown in FIG. 2 the housing structure, illustrated generally at 20, incorporates a bottom housing 22 and a top housing 24. The bottom housing 22 is preferably formed of rolled metal such as steel with a welded bottom 26 and a threaded top 28. Although the bottom housing size may vary, in one suitable form it may have a size of 22 inches in height by 8 inches in diameter with mounting brackets 27 and 29 welded or otherwise fixed to each side. The top housing 24 of the Smart Antenna is preferably composed of acrylic pipe that has been counter-threaded to mount to the top of the bottom housing. The acrylic upper housing will contain the antennas 40 that are used for transmission and radio direction finding. The acrylic housing will protect the antennas from weather conditions and allow the antennas to operate without obstruction.

With reference to FIG. 2, each Smart Antenna will incorporate a battery pack 30 in the lower portion thereof incorporating rechargeable batteries. The battery pack is provided with six 2-volt, 24-amp hour batteries that will supply 18 months of battery life to the Smart Antenna. Although rechargeable batteries are preferred in the battery pack, on-rechargeable batteries may be employed as well.

Above the battery pack is provided a support partition 32 which provides support for a printed circuit board holder 34 which provides support for a plurality of printed circuit boards such as shown at 36 having a major portion of the circuitry of the Smart Antenna provided thereon. Above the printed circuit board card holder is provided an antenna support partition 38 having a plurality of transmit and receive antennas 40 secured thereto. The antennas are positioned so that transmitted and received signals will be propagated through the acrylic upper housing 24 without any interference from the metal lower housing structure 22.

Figure 3:
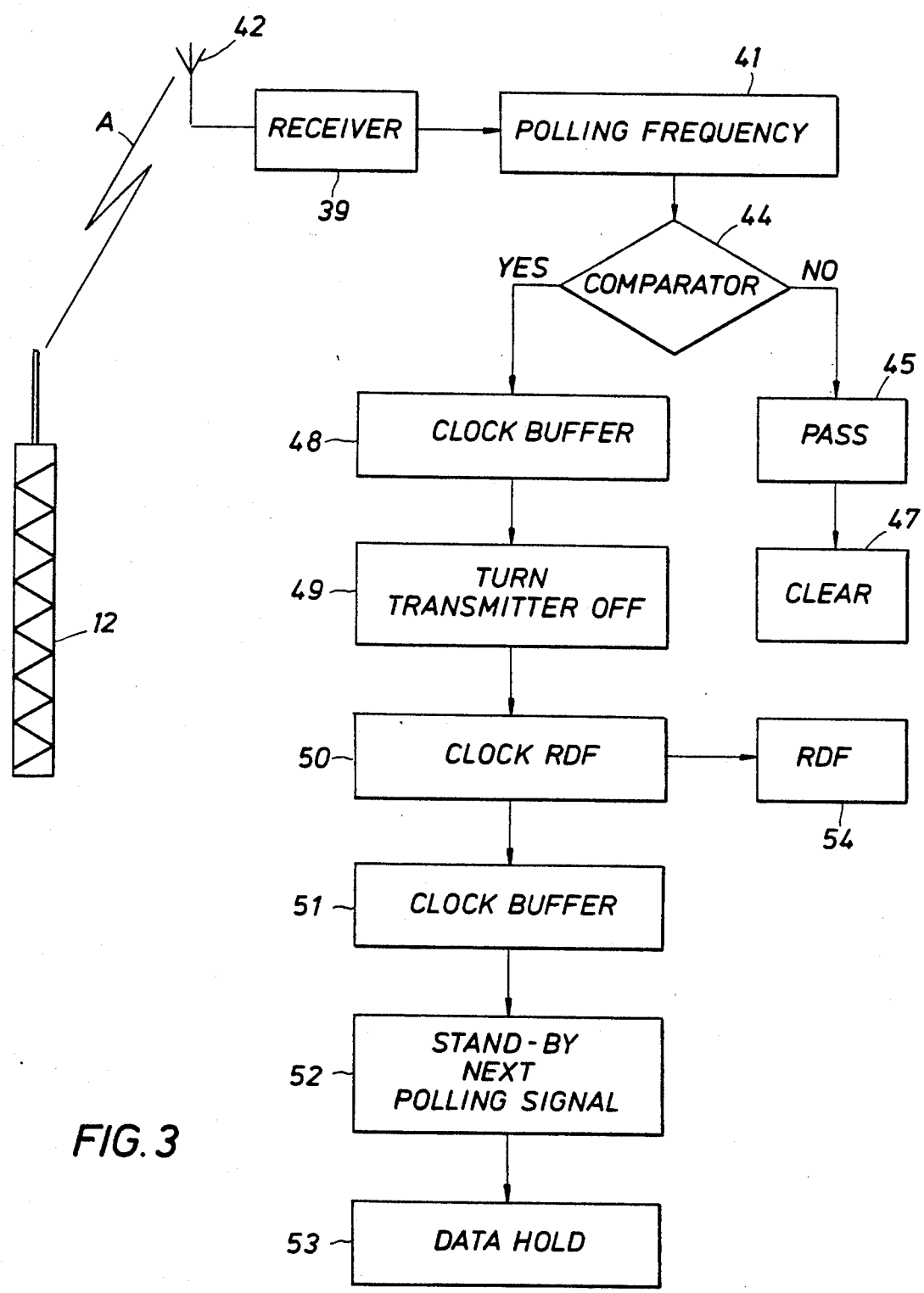

Referring now to FIG. 3 the base antenna 12 is shown to generate a polling signal A, which signal is received by one of the Smart Antennas 14-16. After being received by the receiving antenna 42 of the Smart Antenna, the signal is conducted to receiver circuitry 39 for processing and is then conducted to a polling frequency circuit 41 to insure that the signal is of the correct frequency. For example, the correct frequency may be 159.015 megahertz as indicated or any other suitable frequency. The polling frequency will be transmitted to a comparator circuit 44 where signals of inappropriate frequency will be conducted to pass and clear circuits 45 and 47 respectively. If the frequency is proper, the frequency will be conducted to a series of circuits including a clock buffer 49, which is a circuit for turning the transmitter off, a clock RDF buffer 56, followed by a clock buffer 51 and circuits 52 and 53 enabling the Smart Antenna to stand by for the next polling signal and to hold the data that has been transmitted thereto. After insuring that the signal is of the correct frequency, the Smart Antenna will turn off the transmitter and start an internal clock running. This clock sets up all of the timing for the radio direction finders and receiving systems and is reset each time a polling signal is received.

Figure 4:
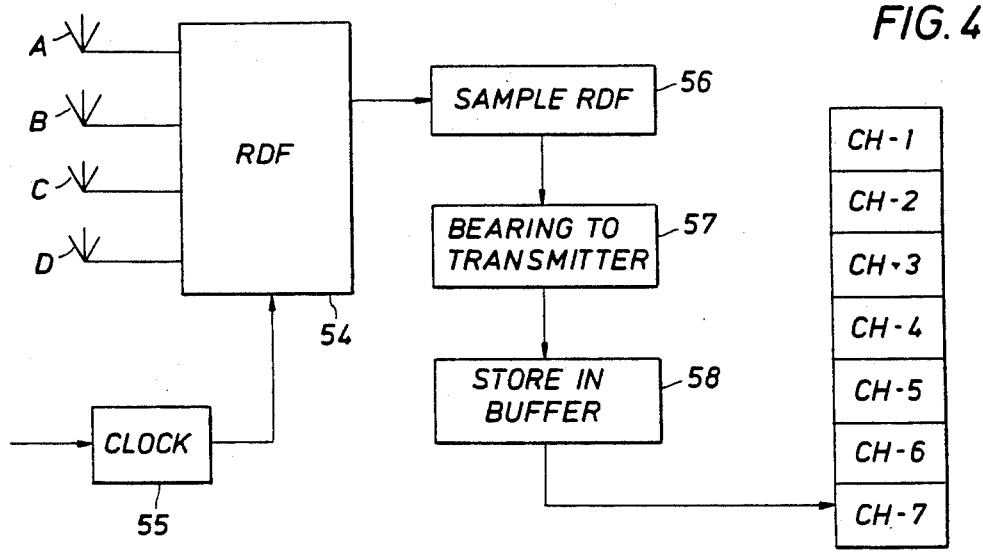

The clock and RDF circuits 50 and 54 are illustrated in FIG. 4 and include the RDF circuit 54 shown in FIG. 3 having its clock control 55. The RDF circuit 54 incorporates X and Y axes antennas identified by letters A, B, C and D. The signals received by these four antenna are processed by the radio direction finding circuit 54 with a signal output thereof being transmitted to a sample RDF circuit 56. The output of this circuit is then processed to yield a signal representing a bearing from the personal transmitter to the Smart Antenna. The bearing signal is stored in a buffer 58 then sorted into the correct channel, CH-1 through CH-7.

Figure 5:
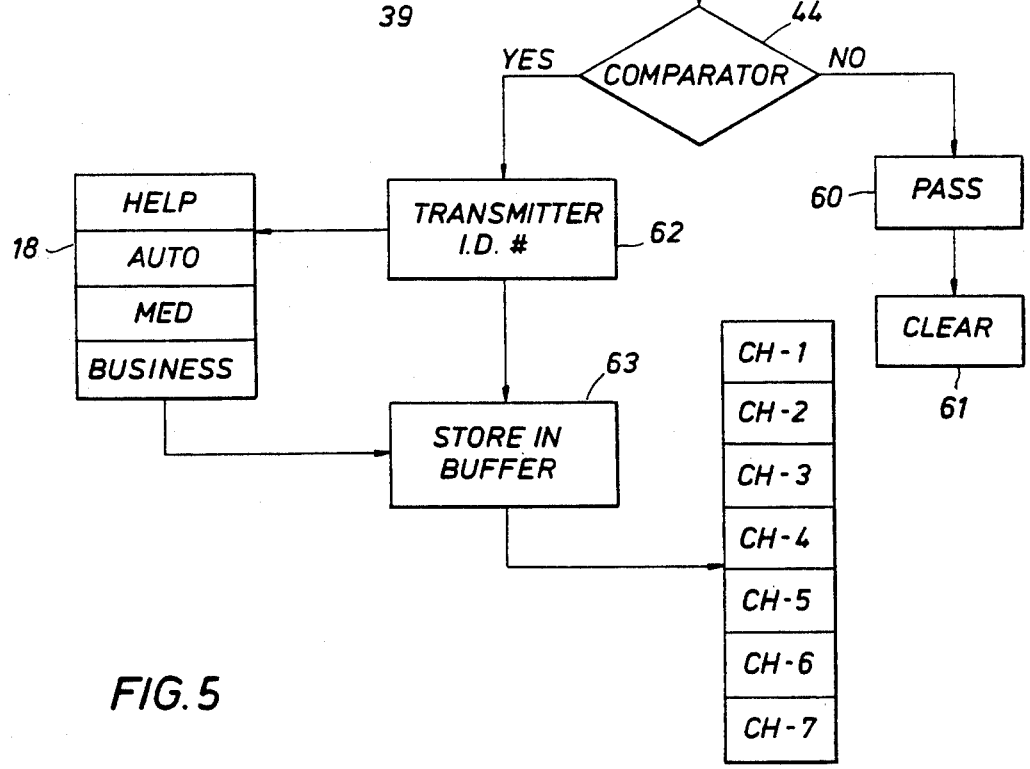

With reference now to FIG. 5, the antenna 43 of the receiver card is shown to receive a radio signal which is processed by the receiver for determination that the frequency is correct. For example, a frequency of 150.775 megahertz may be recognized as the proper transmitter frequency by a frequency comparator circuit 59. The discriminator circuit 44 conducts improper frequencies to pass and clear circuits 60 and 61 and conducts signals at the proper frequency to a transmitter identification circuit 62 where it is processed by a data base to identify the particular transmitter from which the signal is being received. If the frequency is determined to be correct, the circuit 63 receives the transmitter's identification code and alarm code and stores it in the buffer 63 CPR). From the buffer 63 the signal is conducted to the correct channel, i.e., CH-1 to CH-7.

Figure 6:
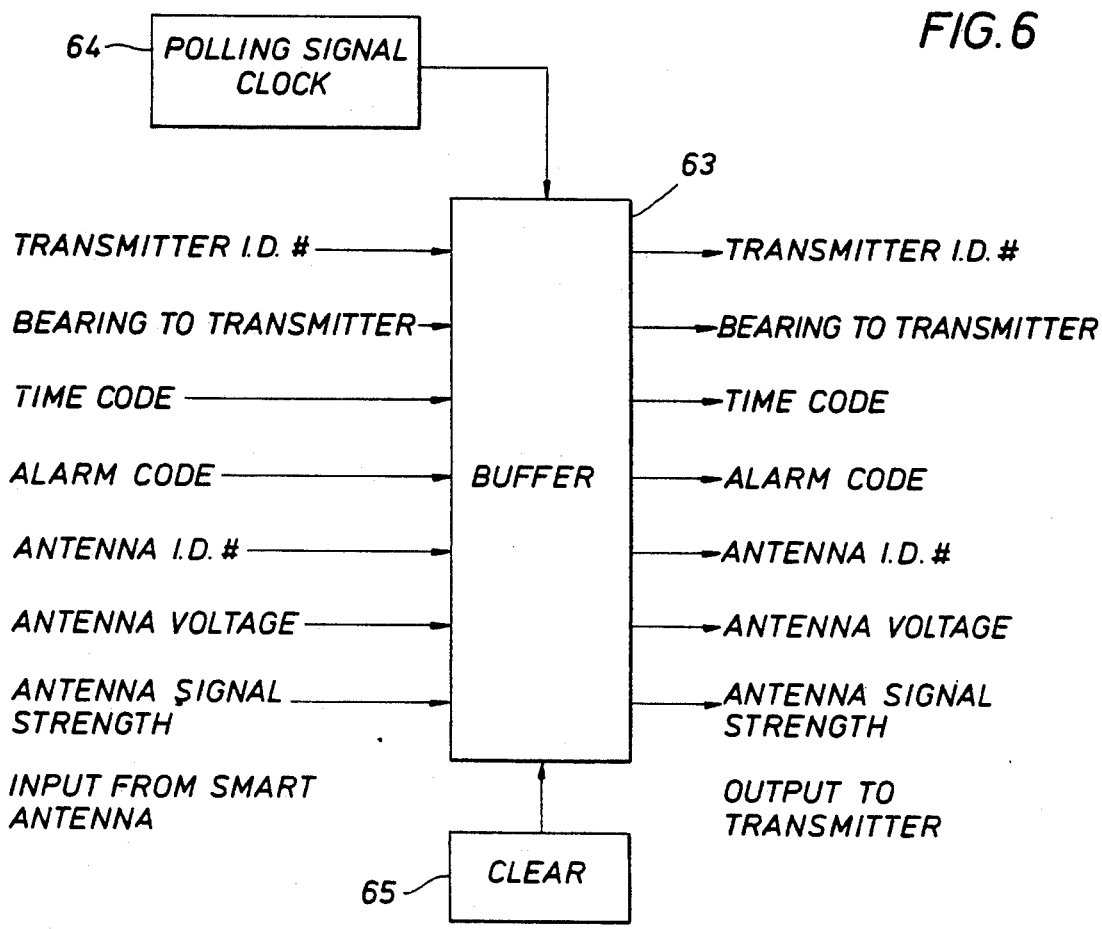

The schematic circuit illustration of FIG. 6 illustrates the buffer 63 receiving a polling signal and clock pulse 64 from the base antenna 12. The Smart Antenna receives transmitter information (transmitter ID code, transmitter alarm code, bearing to the transmitter) and adds current information (antenna ID code, battery voltage, signal strength) and stores it in the buffer 63. On the next polling clock pulse, the buffer will clear by transmitting the information to the base antenna as shown as 65.

As an example, for a personal security system intended for a large city, the computer software will have in its memory all of the major buildings by name and location. This will be an added help in sending assistance to known locations. Again, by making small modifications in the software system, the homes of the various subscribers to the system can be entered into the software and thus can be readily identified and displayed to enable services to be delivered more efficiently to the customers.

The maintenance on the network (antennas, ADF system, computers, software, etc.) will be controlled and monitored by "self-checking software". The software will perform internal checks of the computer and map software at specific time intervals, such as every three minutes for example. If anything is determined to be improper, the computer will identify the problem area and render a printout identifying the problem and a solution to the problem.

The Smart Antennas will transmit the client's transmitter position in terms of X and Y coordinates and will also transmit signals representing battery voltage and will transmit signals representing transmission strength. This information will be input to a maintenance software and any variations will be noted. This information will provide maintenance personnel with a computerized "first repair" list that will be updated periodically. Thus, repair personnel will be provided with an up-to-date list at all times of the particular services that need to be completed to keep the security system in condition for efficient performance.

The personal security system thus provided has the capability of quickly and adequately locating the personal transmitter of a customer with respect to a particular geographical area serviced by the equipment. The customer's location is then identified through computer processing of X and Y coordinate signals generated by the customer's personal transmitter. The customer's transmitter will have effective battery life to exceed the time limit of a service contract, such as six months, one year, etc. At the end of this service contract, the customer would renew the contract and at the same time be provided with a different personal signal transmitter device. The signal transmitter turned in would then be serviced, typically by installing new batteries or recharging the batteries, to insure that it has adequate service life before being provided to a different customer. The particular needs of the customers will be specifically identified by the particular character of the signals that are transmitted. Thus, the customer's needs from the standpoint of personal safety, medical attention, automotive repair, business assistance, can be identified at the time of the transmission and thus service personnel attending the customer's needs will be provided with appropriate equipment.

Figure 7:
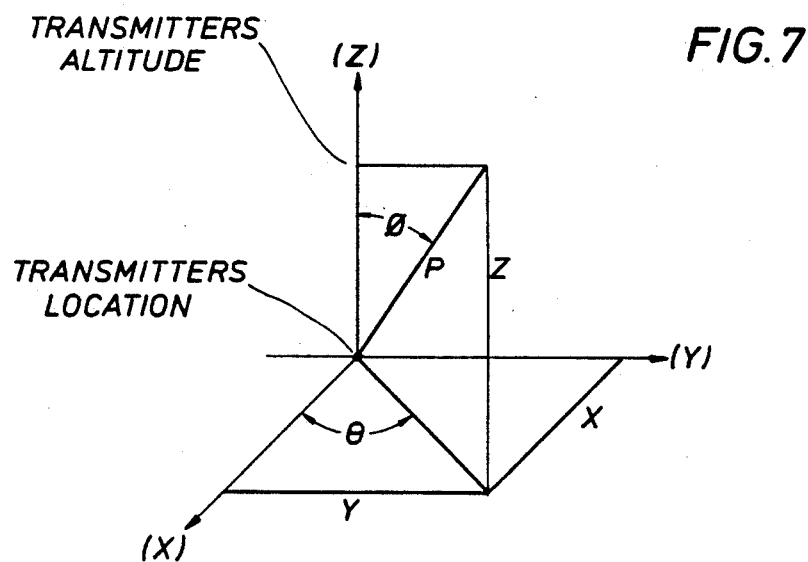

With regard to FIG. 7, which is a diagrammatic illustration shown generally at 10, the signal locating system of this invention will also have the capability of locating the personal signal transmitter 16 in relation to height above the ground. For example, if the customer is located in a tall building, its location in elevation above the ground can be accurately determined to thus enable service personnel to reach the scene of the transmitter quickly. A mathematical computation such as shown schematically generally of 70 in FIG. 7 will be employed to determine the distance of signal travel P, represented by distance line 72, and thus the height Z of the customer's location above ground level represented by height line 74 and the horizontal location point 77 of the customer's transmitter in relation to known coordinates (X), (Y) and (Z). For example, coordinate (X) may represent the East-West coordinate (Y) may represent the North-South Coordinate and (Z) may represent the antenna height of a smart antenna. Angle O is the included angle of a line 79 from the customer horizontal location point 77 to the transmitter location point 81, which line is taken in relation to the known coordinate (X). The customer's transmitter emits a radio signal which is received by automatic direction finding antennas which identify the horizontal bearings from the antenna to the transmitter and which may also identify vertical bearings if transmitter elevation is desired. These bearing signals are processed by the computer in correlation with known reference coordinates with which the computer software is provided. Such computer processing achieves plotting of the transmitter location on an electronic representation of the local area, including plotting of the elevation of the transmitter in relation to a horizontal reference if the elevation of the transmitter is desired. The formulas:

$$X = P \sin \phi \cos \theta$$

$$Y = P \sin \phi \sin \theta, \text{ and}$$

$$Z = P \cos \phi$$

will be employed so as to transform the spherical coordinates P 0 to rectangular coordinates X, Y and Z, represented by coordinate lines 74, 76 and 78. Through the use of these formulas by way of computer processing of the buffer the height of the signal transmission of the customer's remote transmitter will be accurately determined.

This invention is therefore is one well adapted to attain all of the objects and features inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in any limiting sense.

What is claimed is:

1. A method for location of a mobile personal transmitter within a geographical area for the provision of requested services desired by a person selectively transmitting a coded frequency from said mobile personal transmitter, comprising:
    (a) transmitting a selected radio frequency signal from said mobile personal transmitter having the capability of transmitting selected ones of a plurality of signals each having X and Y signal axes components, said selected signal designating a desired service;
    (b) receiving said selected radio signal by two or more of a plurality of antenna/transmitters strategically positioned in said geographical area and transmitting said received signal to a base station antenna located within said geographical area; and
    (c) computer processing and plotting of said X and Y signal axes components of said selected signal by means of a computer having a cathode ray tube and having software presenting on said cathode ray tube a computer grid-work representing said geographical area, thus identifying the location of the radio signal emitted by said mobile personal transmitter relative to said computer grid-work of said geographical area.

2. The method of claim 1, wherein:
said computer processing includes processing said X axis and axis signal components with automatic direction finding circuitry to provide an ADF signal representing the location of said mobile personal transmitter relative to said grid-work representing said geographical area.

3. The method of claim 1, wherein:
    (a) said antenna/transmitters are positioned at predetermined locations relative to said grid-work; and
    (b) said computer processing includes averaging the X axis and Y axis signal components from each antenna/transmitter to thus provide an averaged signal that is processed and displayed by said cathode ray tube of said computer on a computerized map of said geographical area.

4. The method of claim 1, including:
transmitting from said mobile personal transmitter one of a plurality of radio signals coded to a particular service that is requested at the site of said mobile personal transmitter.

5. The method of claim 1, including:

accomplishing said computer processing by means of said computer software developed to present a map of said geographical area on said cathode ray tube of said computer and by providing said computer with a set of coordinates, causing the computer software to display the particular quadrant within which the radio signal of the mobile personal transmitter emanates to thus provide for location of the source in the geographical area to thus enhance efficient location of the person for provision of the requested assistance.

6. The method of claim 5, including:
amplifying the signal of said mobile personal transmitter by means of said antenna/transmitters being narrowly tuned to the specific frequency of said mobile personal transmitter, said antenna/transmitters amplifying the X axis and Y axis signal components of the mobile personal transmitter signal, and transmitting said amplified signal to said base station antenna which is coupled with an ADF signal processor, thereby insuring that said ADF signal processor will establish an average between only two of said antenna/transmitters.

7. A personal security system for a limited geographical area such as a large city, comprising:
(a) a plurality of mobile personal transmitters each having a plurality of signal transmitting circuits of differing frequency, each of said signal transmitting circuits capable of generating a low VHF band signal having X and Y axes components;
(b) means in each mobile personal transmitter permitting manual selection and activation of one of said plurality of signal transmitting circuits for transmission of a signal of a desired frequency;
(c) a plurality of antenna/transmitters being strategically located within said geographical area, said antenna/transmitters being narrowly tuned to designated receiving frequencies of said mobile personal transmitters and receiving, amplifying and transmitting X axis and Y axis signal components of said mobile personal transmitters;
(d) base antenna means for receiving signals from said antenna/transmitters; and
(e) computer means being interfaced with said base receiving means and being operative to receive said X axis and Y axis signal components of said antenna/transmitters and process said X axis and Y axis signal components of said antenna/transmitters according to software instructions and to plot said X axis and Y axis signal components on a computerized grid-work of said geographical area thus identifying the location of signal transmission from said mobile personal transmitters on said computerized grid-work.

8. The personal security system as recited in claim 7, wherein:
(a) said plurality of said antenna/transmitters are located in substantially evenly spaced relation in said geographical area to thus form an antenna grid-work corresponding to said computerized grid-work of said geographical area; and
(b) said antenna/transmitters each include automatic direction finding circuitry for processing said X axis and Y axis signal components for establishing a bearing from said antenna/transmitters to the location of said mobile personal transmitters relative to said grid-work of said geographical area.

9. The personal security system of claim 8, wherein:
said antenna/transmitters each include three axis signal components for establishing the position of the mobile personal transmitters in terms of X, Y and Z axes signal components on said grid-work and transmitting signals identifying the position of said mobile personal transmitters to said base antenna means.

10. The personal security system of claim 9, wherein:
said antenna/transmitters transmit signals representing battery voltage and transmission strength, said signals being processed by said computer to provide appropriate indications when service is required.

11. The personal security system of claim 10, wherein:
(a) a base station antenna is provided to receive signals transmitted by said antenna/transmitters;
(b) automatic direction finding circuitry is coupled with said base station antenna and thus receives and averages said X axis and Y axis signal components to provide an ADF output; and
(c) said computer means receives said ADF output and processes it to yield X axis and Y axis position signals for location of said mobile personal transmitters relative to said computerized grid-work of said geographical area.

12. The personal security system of claim 11, wherein:
said computer means includes software programmed to identify specific structures on individual grids of said computer grid-work and capable of displaying a single computer grid section and the position of the signals transmitted by said mobile personal transmitters relative to said computer grid-work to thus enable personnel to efficiently locate a mobile personal transmitter and the person requesting assistance.

13. A transmitter/antenna for a personal security system having the capability of identifying the location of a signal transmission in a specific geographical area, comprising:
(a) an antenna housing having a lower housing section composed of metal and having an upper housing section composed of a polymer;
(b) a battery pack being located in said lower housing section and providing electrical power to said transmitter/antenna;
(c) a plurality of printed circuit boards being supported within said lower housing section and defining a major portion of the electrical circuitry of said transmitter/antenna; and
(d) a plurality of transmit and receive antennas being provided in said upper housing section for radio direction finding and being positioned within said upper housing section for transmitting and receiving radio signals propagated through said polymer material of said upper housing section.

14. The transmitter/antenna of claim 13, wherein:
said upper and lower housing sections are in threaded assembly;

15. The transmitter/antenna of claim 13, including:
(a) a circuit board holder being supported within said lower housing section; and
(b) said printed circuit boards being supported by said circuit board holder.

* * * * *